Guntis Brunins,
INVENTOR.

United States Patent Office 3,411,086
Patented Nov. 12, 1968

3,411,086
D.C. VOLTAGE COMPARATOR SYSTEM USING A BEAM DEFLECTION TUBE
Guntis Brunins, Hyattsville, Md., assignor, by mesne assignments, to the United States of America as represented by the Secretary of the Army
Filed Mar. 9, 1964, Ser. No. 350,625
10 Claims. (Cl. 324—121)

ABSTRACT OF THE DISCLOSURE

A D.C. voltage comparator system using a beam deflection tube with an A.C. biasing voltage, applying the D.C. signal inputs to the deflecting plates of the tube, and utilizing an A.C. output circuit across the plates of the tube.

---

In the past conversion of a D.C. signal into an A.C. output required separate choppers or modulators and amplifiers. Also, extending the frequency over the commonly used synchronous vibrator requires corresponding high speed switching circuitry and usually added complexity. A converter must be capable of following rapid changes of D.C. levels.

The need for a reliable null indicator has long been present. The system used must not be affected by drift in its tube's plate supply levels, bias supply levels, filament voltage supply or due to aging. Also the null indicator must be independent of the magnitude of the A.C. input to the grid within the tube's operating range.

It is therefore, an object of this invention to provide a reliable null indicator for use in bridge circuits, and the like.

A further object of this invention is to provide a converter for conversion of a D.C. signal into an A.C. output by using a beam deflection tube.

A still further object of the present invention is to provide a D.C. voltage comparator by using a beam deflection tube.

Figure 1:
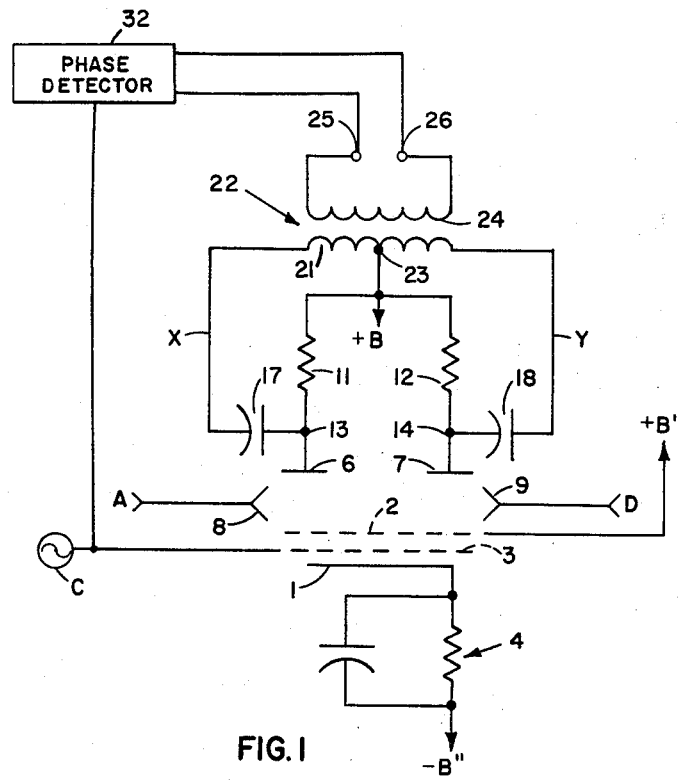
Figure 2:
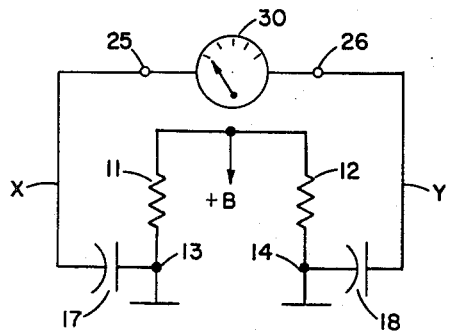

These and other objects and advantages of the present invention will become apparent from the following detailed description and from the accompanying drawings, in which:

FIGURE 1 is a schematic diagram illustrating one preferred form of the present invention; and FIGURE 2 illustrates an adaptation of the invention for direct read out by a meter.

The invention may be better understood with reference to the drawings in which reference number 1 indicates a cathode of a beam deflection tube. The beam deflection tube may be an RCA-7360 beam deflection tube. Cathode 1 is connected to —B" by way of a filter circuit 4. Grid 2 is connected to a source of D.C. bias voltage +B'. A source of A.C. signals C is supplied to grid 3. Plates 6 and 7 are connected to a source of D.C. supply +B by way of resistors 11 and 12, and junctions 13 and 14.

A signal voltage A is connected to deflecting plate 8. A reference or another signal voltage D is connected to deflecting plate 9. Connected to junctions 13 and 14 are blocking capacitors 17 and 18 respectively. Capacitors 17 and 18 are connected to opposite sides of a primary winding 21 of center-tapped transformer 22 which constitutes a push-pull circuit. Primary winding 21 has a center tap 23 connected to the +B supply. Secondary winding 24 is connected to output terminals 25 and 26.

FIGURE 2 shows an alternate system, whereby output leads 25 and 26 are connected directly to capacitors 17 and 18 by way of leads X and Y. An ungrounded A.C. voltmeter, phase detecting circuit, etc., 30 can be connected to output terminals 25 and 26 of either FIGURE 1 or 2.

In a beam deflection tube the electron beam distribution between the two anodes is a function of the potential difference between the deflection electrodes. However, a D.C. potential is required if the deflecting electrodes are to properly focus the beam and enable the tube to operate at a reasonable deflection sensitivity. For the RCA-7360 the optimum mean deflecting electrode voltage lies between 20 to 35 volts positive with respect to the cathode. For linear operation, the variation of the deflecting electrode voltage about its means is to be no more than 8 volts peak-to-peak.

If an A.C. signal is impressed on grid 3 a D.C. voltage level equality at the deflecting electrodes appears as a D.C. and A.C. null on the output terminals 25 and 26. The A.C. performance as a function of D.C. level changes at the deflecting electrodes is to be considered here. In the case of the A.C. null, two signals appearing at X and Y in phase and equal in amplitude cancel each other at output terminals 25 and 26. As the difference in the deflecting electrode voltage levels changes, one of the A.C. signals in the anode circuit will increase in amplitude while the other decreases an equal amount. Thus is obtained a very sensitive voltage difference indicator which clearly indicates:

(a) D.C. input voltage level equality at the deflecting plates and, (b) In the case of an inequality at this point, which D.C. input voltage is the larger (or smaller) of the two.

In order to carry out (b) above a phase detector 32 is required. Said phase detector has one input connected to output terminals 25 and 26, and another input connected to signal C. These connections (shown in FIGURE 1) would be the same for FIGURE 2. If the signal at X is larger than the signal at Y the output on terminals 25 and 26 will have a first phase relationship with respect to source C. However, if the signal at Y is larger than the signal at X then the output on terminals 25 and 26 will have a second phase relationship with respect to source C which is 180 degrees out of phase to said first phase relationship. Thus a phase detector can be calibrated to read which signal is the stronger. Combining this with a voltmeter will tell the operator which signal is the stronger and by how much.

Some applications of this invention are:

(A) Power supply stabilization.—It is usually required to compare a D.C. voltage at A against a reference at D and to compensate for an inequality. In this case one could use 60 cycles or some harmonic of 60 cycles as the A.C. signal input or an auxiliary oscillator.

(B) Test or other types of equipment wherever the measured quantity is converted to D.C. voltage for comparison purposes.

(C) Test or other types of equipment wherever the measured quantity is converted to D.C. voltage chopped and processed as modulated A.C. voltage.

(D) Wherever a null detector is required, as in bridge circuits, etc.

(E) Wherever an automatic balancing requirement is needed, as in gain controls, etc.

Some advantages of the system are:

(A) Simplicity.—Conversion of a D.C. signal to an A.C. output does not require separate choppers or modulators and amplifiers. Also, extending the frequency range over the commonly used synchronous vibrator requires corresponding high speed switching circuitry and usually added complexity.

(B) Utility.—The circuit is capable of following rapid changes of D.C. levels because the A.C. input to the grid can extend to 100 mc. within limitations stated below.

(C) Minimum effect of drift.—The tube's use as a null indicator is not affected by drift in plate supply levels, bias supply levels, filament voltage, and aging. Although the sensitivity of the tube to differences at the deflecting electrodes (or the deflecting electrode-anode transconductance) is a function of drift in grid bias, aging, etc., the capability to locate a null is not destroyed. Also the A.C. null is independent of the magnitude of the A.C. input to the grid within the tube's operating range.

(D) *Complexity and cost.*—Because the tube can be consireded a plug-in module, it is provided flexibility in application and ease in troubleshooting. The RCA–7360 is inexpensive.

While the invention has been descdibed with reference to a preferred embodiment thereof, it will be apparent that various modifications and other embodiments thereof will occur to those skilled in the art within the scope of the invention. Accordingly, I desire the scope of my invention to be limited only by the appended claims.

I claim:

1. A voltage comparator comprising in combination a beam deflection tube having a cathode, first anode, second anode, first deflecting plate, second deflecting plate, and a grid; first and second resistors connected to said first and second anodes respectively at one end and connected to each other at their other end; a source of D.C. supply voltage connected between said other end of the resistors and said cathode; a source of A.C. voltage connected to said grid; signal voltages to be compared connected to said first and second deflecting plates; and output circuit means connected between a first junction between the first resistor and said first anode and a second junction between said second resistor and the second anode and wherein said signal voltages to be compared consist of first and second D.C. signal voltages connected to said first and second deflecting plates respectively.

2. A voltage comparator as set forth in claim 1 further comprising a first capacitor connected between said first junction and said output circuit; and a second capacitor ocnnected between said second junction and said output circuit.

3. A voltage comparator as set forth in claim 2, wherein said output circuit is a voltmeter.

4. A voltage comparator as set forth in claim 2, wherein said output circuit is a push-pull circuit.

5. A voltage compaartor as set forth in claim 4, wherein said output circuit further includes a phase detector.

6. A voltage comparator as set fourth in claim 2, wherein said output circuit consists of a transformer having a primary winding connected between said capacitors, a secondary winding connected to a load, a tap connection on the primary winding, and means connecting said tap to a third junction between said first and second resistors.

7. A voltage comparator as set forth in claim 1, wherein said signal voltages are connected to said first deflecting plate; and further comprising a reference voltage connected to said second deflecting plate.

8. A voltage comparator as set forth in claim 7 wherein said signal voltages are D.C. signal voltages; and said reference voltage is D.C. voltage.

9. A voltage comparator as set forth in claim 8 further comprising a first capacitor connected between said first junction and said output circuit; and a second capacitor connected between said second junction and said output circuit.

10. A voltage comparator as set forth in claim 9, wherein said output circuit is a voltmeter.

References Cited

UNITED STATES PATENTS

| | | | |
|---|---|---|---|
| 2,934,598 | 4/1960 | Richman. | |
| 2,946,961 | 7/1960 | Lind | 315—21X |
| 3,034,045 | 5/1962 | Weinschel | 324—95X |
| 3,064,198 | 11/1962 | Hobrough | 315—21X |

RUDOLPH V. ROLINEC, *Primary Examiner.*

E. F. KARLSEN, *Assistant Examiner.*